United States Patent
Tanabe et al.

(10) Patent No.: US 7,995,251 B2
(45) Date of Patent: Aug. 9, 2011

(54) OPTICAL SCANNING DEVICE, OPTICAL SCANNING METHOD, AND IMAGE FORMING APPARATUS

(75) Inventors: Jun Tanabe, Kanagawa (JP); Masaaki Ishida, Kanagawa (JP); Yasuhiro Nihei, Kanagawa (JP); Atsufumi Omori, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 762 days.

(21) Appl. No.: 12/055,666

(22) Filed: Mar. 26, 2008

(65) Prior Publication Data
US 2008/0239336 A1    Oct. 2, 2008

(30) Foreign Application Priority Data

Mar. 30, 2007 (JP) ................................ 2007-090332
Mar. 30, 2007 (JP) ................................ 2007-090986

(51) Int. Cl.
*H04N 1/04* (2006.01)

(52) U.S. Cl. ........ 358/482; 358/481; 358/480; 358/475; 358/1.7

(58) Field of Classification Search .................. 358/482, 358/481, 480, 475, 1.7
See application file for complete search history.

(56) References Cited

U.S. PATENT DOCUMENTS

| | | | |
|---|---|---|---|
| 6,157,389 A * | 12/2000 | Knowlton | 345/660 |
| 6,442,060 B1 | 8/2002 | Leung et al. | |
| 6,791,596 B2 | 9/2004 | Nihei et al. | |
| 6,798,682 B2 | 9/2004 | Chuang et al. | |
| 6,927,789 B2 | 8/2005 | Ozasa et al. | |
| 6,933,957 B2 | 8/2005 | Omori et al. | |
| 7,212,224 B2 | 5/2007 | Nihei et al. | |
| 7,256,815 B2 | 8/2007 | Suzuki et al. | |
| 7,271,824 B2 | 9/2007 | Omori et al. | |
| 7,283,151 B2 | 10/2007 | Nihei et al. | |
| 7,285,808 B2 * | 10/2007 | Kasuga | 257/223 |
| 7,327,379 B2 | 2/2008 | Nihei et al. | |
| 2002/0051379 A1 | 5/2002 | Deng et al. | |
| 2004/0155281 A1 | 8/2004 | Osada et al. | |
| 2005/0089069 A1 | 4/2005 | Ozasa et al. | |
| 2005/0219354 A1 | 10/2005 | Omori et al. | |
| 2005/0243163 A1 | 11/2005 | Ozasa et al. | |
| 2006/0209170 A1 | 9/2006 | Nihei | |

(Continued)

FOREIGN PATENT DOCUMENTS

EP    1 465 200    10/2004

(Continued)

OTHER PUBLICATIONS

K. Takeuchi et al.: "A Study of Threshold Voltage Variation for Ultra SmallBulk and SOI CMOS", IEEE TED, vol. 48, No. 9, Sep. 2001.

(Continued)

*Primary Examiner* — Hhoushang Safaipour
(74) *Attorney, Agent, or Firm* — Oblon, Spivak, McClelland, Maier & Neustadt, L.L.P.

(57) ABSTRACT

A light-source drive control unit divides each pixel of the image data into a plurality of subpixels, deletes certain subpixels from the image data in accordance with predetermined correction data, shifts remaining subpixels in the sub-scanning direction thereby obtaining reduced image data, and controls a plurality of light sources based on the reduced image data in such a manner that one line of the subpixels is formed with a light beam emitted from a corresponding one of the light sources.

19 Claims, 14 Drawing Sheets

U.S. PATENT DOCUMENTS

| | | |
|---|---|---|
| 2006/0274569 A1 | 12/2006 | Joshi et al. |
| 2006/0285186 A1 | 12/2006 | Ishida et al. |
| 2007/0030548 A1 | 2/2007 | Nihei et al. |
| 2007/0091163 A1 | 4/2007 | Omori et al. |
| 2007/0132828 A1 | 6/2007 | Ishida et al. |

FOREIGN PATENT DOCUMENTS

| | | |
|---|---|---|
| JP | 2001-272615 | 10/2001 |
| JP | 2001-350111 | 12/2001 |
| JP | 2003-72135 | 3/2003 |
| JP | 3644923 | 2/2005 |

OTHER PUBLICATIONS

M. Yamaoka, et al..: "Low Power SRAM Menu for SOC Application Using Yin-Yang-Feedback Memory Cell Technology", Symposium on VLSI circuits, Digest of Technical Papers, Honolulu, USA, Jun. 2004.

J. J. Kim et al.: Back-Gate Controlled READ SRAM with Improved Stability, IEEE SOI Conference, pp. 211-212, Hawaii, USA, 2005.

A. Chandrakasan et al.: "Design of High-Performance Microprocessor Circuits", IEEE press, pp. 285-308, FOX 2001.

Agarwal, et al.: "DRG-Cache A Data Retention Gated-Ground Cache for Low Power", DAC, pp. 473-478, Jun. 2002.

N. Azizi, et al.: "Low Leakage Asymmetric-Cell SRAM", IEE TVLSI, vol. 11, Issue 4, pp. 701-715, Aug. 2003.

K. Flaunter et al.: "Drowsy Caches: Simple Techniques for Reducing Leakage Power", ISCAS, Arizona, USA, May 2002.

L. Mathew et al.: "CMOS Vertical Multiple Independent Gate Field Effect Transistor (MIGFET)", IEEE SOI, Conference, Oct. 2004.

K. Takeda et al.: "A 16-Mb 400-MHz Loadless CMOS Four-Transistor SRAM Macro", IEEE, JSSC, vol. 35, No. 11, Nov. 2000.

K. Osada et al.: "16.7-fA/Cell Tunnel-Leakage-Suppressed 16-Mb SRAM for Handling Cosmic-Ray-Induced Multierros", IEEE JSSC, vol. 38, No. 11, Nov. 2003.

E. Seevinck, et al.: "Static-Noise Margin Analysis of MOS SRAM cells", IEEE JSSC, vol. SC-22, No. 5, Oct. 1987.

M. Vinet et al.: "Planar Double Gate CMOS Transistors with 40nm Metal Gate for Multipurpose Applications", SSDM, 2004.

Christ H. Kim, et al.: "PVT-Aware Leakage Reduction for On-Die Caches with Improved Read Stability", IEEE International Solid-State Circuits Conference, 2005, Session 26, Static Memory.

Kedzierski, et al.: "High-Performance Symmetric-Gate and CMOS-Compatible Vt Asymmetric-Gate FinFET Devices" 2001, International Electron Devices Meetin 437-440.

G. Ilicali, et al.: Planar Double Gate Transistors with Asymmetric Independent Gates,: International SOI conference, 2005, pp. 126-127.

C.-H. Lu, et al.: Characteristics and Mechanism of Tunable Work Function Gate Electrodes Using a Bilayer Metal Structure on SiO2 and Hf02, EDL, vol. 26(7), 2005, pp. 445-447.

L. Matthew et al.: "Multiple Independent Gate Field Effect Transistor (MIGFET)-Multi-Fin RF Mixer Architecture, Three Independent Gates (MIGFET-T), Operation and Temperature Characteristics", Symposium on VLSI Technology Digest of Technical Papers, 2005.

O. Thomas: "An SOI 4 Transistors Self-Refresh Ultra-Low Voltage Memory Cell", ISCAS, Thailand, Bangkok, May 2003.

French Preliminary Search Report, FA 689387, FR 0656014, dated Jul. 18, 2007.

\* cited by examiner

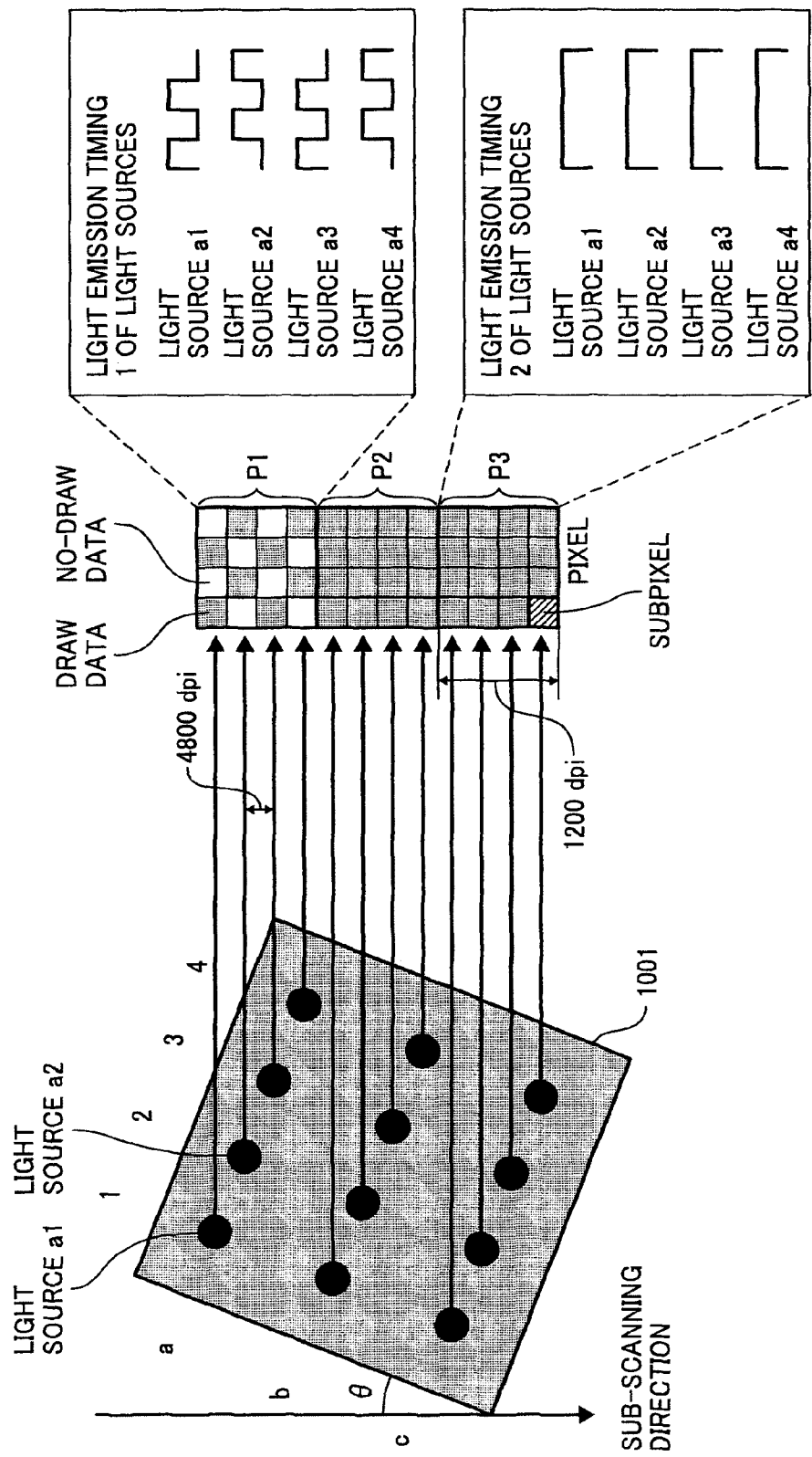

OPTICAL SCANNING DEVICE, OPTICAL SCANNING METHOD, AND IMAGE FORMING APPARATUS

CROSS-REFERENCE TO RELATED APPLICATIONS

The present application claims priority to and incorporates by reference the entire contents of Japanese priority documents 2007-090986 filed in Japan on Mar. 30, 2007 and 2007-090332 filed in Japan on Mar. 30, 2007.

BACKGROUND OF THE INVENTION

1. Field of the Invention

The present invention relates to an optical scanning device, an optical scanning method, and an image forming apparatus.

2. Description of the Related Art

FIG. 17 is an example of a configuration of a conventional image forming apparatus (writing optical system). The conventional image forming apparatus is, for example, a laser printer or a digital copy machine. The conventional image forming apparatus performs electrophotographic process.

A laser diode unit 1001 (light source unit) emits a laser beam, and the emitted laser beam is deflected by a polygon mirror 1002 that is rotating. The deflected laser beam passes through a scanning lens (fθ lens) 1003, and illuminates a photosensitive element 1004 that is a medium to be scanned, and thereby an optical spot is formed on the photosensitive element 1004. Thus, an electrostatic latent image is formed onto the photosensitive element 1004 by projecting the laser beam onto the photosensitive element 1004. A phase synchronizing circuit 1009 synchronizes a phase of a modulation signal generated by a clock generating circuit 1008 with an output signal from a photodetector 1005. The photodetector 1005 detects a laser beam that is emitted from a laser diode and deflected by the polygon mirror 1002. Specifically, the phase synchronizing circuit 1009 generates an image clock (pixel clock) that is phase-synchronized with an output signal from the photodetector 1005 each time one line of an image is scanned, and supplies the generated image clock to an image processing unit 1006 and a laser driving circuit 1007. The laser diode unit 1001 controls light emission time of the laser diode through the laser driving circuit 1007 in accordance with image data generated by the image processing unit 1006 and the image clock generated by the phase synchronizing circuit 1009. Thus, it is possible to control forming of an electrostatic latent image on the photosensitive element 1004.

In recent years, faster printing speed (image forming speed) and higher image quality have been required, and improvement has been achieved in a rotational speed of a polygon motor serving as a deflector, and a frequency of a pixel clock used as a reference clock for modulating a laser beam from a light source. However, the rotational speed of the polygon motor and the frequency of the pixel clock cannot be further improved by a conventional technology.

In a conventional technology, a multi-beam optical scanning method has been developed in which a plurality of light sources is used. The multi-beam optical scanning method makes it possible to increase the number of light beams to be deflected by a deflector and projected onto a target surface at the same time. Therefore, it is possible to reduce the rotational speed of the polygon motor and the frequency of the pixel clock. Thus, optical scanning and image forming can be performed at a high speed and in a stable manner.

A light source used for the multi-beam optical scanning is configured by, for example, combining laser chips each emitting a single beam, or employing a laser diode (LD) array in which a plurality of light emitting elements is incorporated into one laser chip.

A laser diode included in the LD array has been widely used as a light source in a laser printer or the like, because such a laser diode is extremely small size, and a light beam from the laser diode can be directly modulated with a driving current at a high speed. However, the relation between the drive current and light output from the laser diode depends on a temperature, and therefore it is difficult to set a light intensity of the laser diode to a desired value. In a case of a surface-emitting laser, because a plurality of light sources is arranged on the same chip, the interval between the light sources becomes short. As a result, the surface-emitting laser is remarkably affected by a change in temperature due to switch ON/OFF of the light sources and temperature crosstalk. Therefore, it is likely to cause fluctuation in light intensity.

For example, Japanese Patent Application Laid-open No. 2001-272615 discloses a conventional optical scanning apparatus in which a plurality of light sources is arranged two-dimensionally, and a plurality of light beams from the light sources are deflected by a deflector, and projected onto a medium to be scanned. In the optical scanning apparatus, light emitting points are arranged at a maximum density while crosstalk due to heat that occurs between the light emitting points is prevented.

Japanese Patent Application Laid-open No. 2003-72135 discloses a conventional image forming apparatus that employs a surface-emitting laser. The image forming apparatus implements a method of controlling a pixel of an electrostatic latent image by changing light emission intensity of a chip for each pixel, and controlling light emission time.

Japanese Patent Application Laid-open No. 2001-350111 discloses a conventional scanning apparatus that employs a surface-emitting laser. In the scanning apparatus, light sources are arranged in a prescribed manner, so that thermal crosstalk can be prevented, and a density of recorded images can be improved.

However, a problem occurs when images are printed on both surfaces of a sheet. Specifically, the sheet shrinks due to heat applied when an image is printed on one surface (e.g., the front surface) of the sheet. If an image is printed on the other surface (e.g., the back surface) of the shrunk sheet, the image printed on the back surface is relatively larger than the image printed on the front surface due to the shrinking of the paper in printing of the image on the front surface.

SUMMARY OF THE INVENTION

It is an object of the present invention to at least partially solve the problems in the conventional technology.

According to an aspect of the present invention, there is provided an optical scanning device that scans a target surface in a main scanning direction with a plurality of light beams based on image data. The optical scanning device includes a plurality of light sources that is arranged at different positions in a sub-scanning direction, and emits the light beams based on the image data; and a light-source drive control unit that divides each pixel of the image data into a plurality of subpixels; deletes certain subpixels from the image data in accordance with predetermined correction data; shifts remaining subpixels in the sub-scanning direction in position of deleted subpixels thereby obtaining reduced image data; and controls the light sources based on the reduced image data in such a manner that one line of the subpixels is formed with a light beam emitted from a corresponding one of the light sources.

According to another aspect of the present invention, there is provided an optical scanning device that scans a target surface in a main scanning direction with a plurality of light beams based on image data. The optical scanning device includes a plurality of light sources that is arranged at different positions in a sub-scanning direction, and emits the light beams based on the image data; and a light-source drive control unit that divides each pixel of the image data into a plurality of subpixels; adds certain subpixels in the image data in accordance with predetermined correction data; shifts remaining subpixels in the sub-scanning direction in position of deleted subpixels thereby obtaining enlarged image data; and controls the light sources based on the enlarged image data in such a manner that one line of the subpixels is formed with a light beam emitted from a corresponding one of the light sources.

According to still another aspect of the present invention, there is provided an image forming apparatus that includes the above optical scanning device.

According to still another aspect of the present invention, there is provided an optical scanning method of scanning a target surface in a main scanning direction with a plurality of light beams based on image data. The optical scanning method includes preprocessing the image data including dividing each pixel of the image data into a plurality of subpixels; deleting certain subpixels from the image data in accordance with predetermined correction data; shifting remaining subpixels in the sub-scanning direction in position of deleted subpixels thereby obtaining reduced image data; and controlling a plurality of light sources that is arranged at different positions in a sub-scanning direction based on the reduced image data in such a manner that one line of the subpixels is formed with a light beam emitted from a corresponding one of the light sources.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is an example of a laser diode unit of the optical scanning device;

DETAILED DESCRIPTION OF THE PREFERRED EMBODIMENTS

Exemplary embodiments of the present invention are explained in detail below with reference to the accompanying drawings.

In a first embodiment of the present invention, a pixel is used as one pixel as generally defined (for example, a pixel of 2400 dpi means an approximately 10.6-μm square). A pixel in the first embodiment does not mean the one obtained by combining a plurality of pixels (for example, 4×4 pixels) like a dither matrix.

Figure 1:
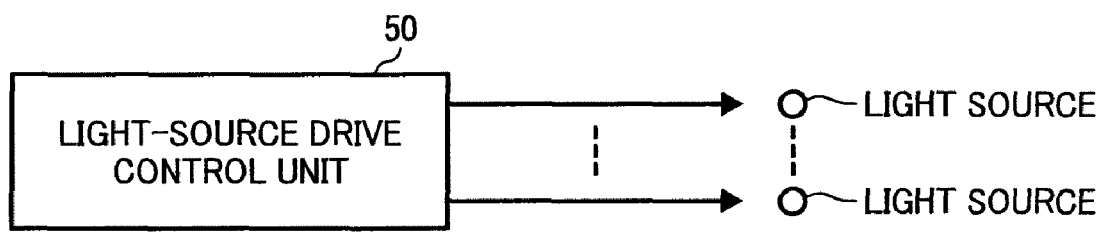
FIG. 1 is an example of a configuration of an optical scanning device according to a first embodiment of the present invention.

FIG. 1 is an example of a configuration of an optical scanning device according to the first embodiment. The optical scanning device scans a target surface in a main scanning direction with a plurality of light beams based on image data. The optical scanning device includes a plurality of light sources that emits the light beams, and a light-source drive control unit 50 that controls the light sources. The light sources are arranged at different positions in a sub-scanning direction. The image data includes a plurality of pixels, and each of the pixels includes a plurality of subpixels. One line of the subpixels is formed with a light beam emitted from a corresponding one of the light sources. The light-source drive control unit deletes certain subpixels from the image data in accordance with predetermined correction data, and shifts remaining subpixels in the sub-scanning direction in position of the deleted subpixels thereby obtaining reduced image data. The light-source drive control unit then controls the light sources based on the reduced image data.

Figure 17:
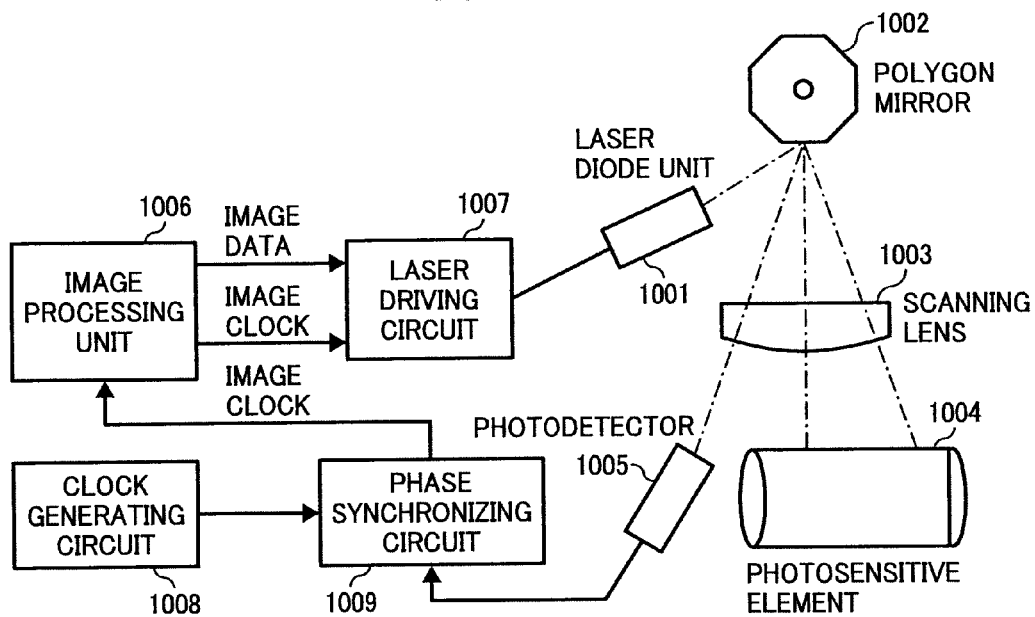
FIG. 17 is an example of a configuration of a conventional image forming apparatus.

FIG. 2 is an example of the laser diode unit 1001. In the image forming apparatus shown in FIG. 17, the laser diode unit 1001 is configured in a manner shown in FIG. 2. Specifically, the laser diode unit 1001 includes a laser diode array in which a plurality of light sources (laser diodes) is arranged in a grid pattern. The laser diode array is, for example, a surface-emitting laser array in which a plurality of light sources is arranged on the same chip in a grid pattern. The light sources are, for example, a plurality of surface-emitting lasers such as vertical cavity surface emitting lasers (VCSEL) or surface-emitting laser diodes. A position and an orientation of the laser diode unit 1001 are adjusted in such a manner that the light sources are arranged on a line that makes an angle θ with a rotational axis of a deflector, such as the polygon mirror 1002 shown in FIG. 17.

The laser diode unit 1001 includes a light source a1, a light source a2, a light source a3, and a light source a4 that are arranged in a vertical array direction a. Assume that the optical scanning device scans a target surface with light beams emitted from the light sources a2 and a3 out of the four light sources a1 to a4, thereby forming one pixel (it is assumed that one pixel is formed by four light sources that are arranged in one virtual line). When it is required to form pixels at a density of 600 dpi, a distance between two light sources is set to a distance equivalent to approximately 2400 dpi. Thus, the density of light sources is four times as high as that of pixels. However, it is possible to obtain the pixel density higher than a quarter of the light-source density by, for example, changing a ratio of light intensity between the light sources and thereby shifting the center of gravity of pixels in the sub-scanning direction.

Figure 3A:
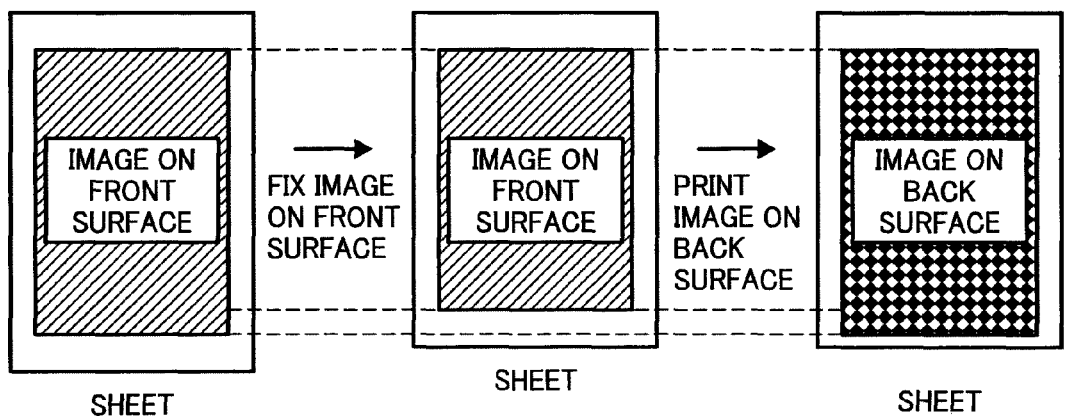
FIGS. 3A and 3B are schematic diagrams for explaining an example in which images are printed on both surfaces of a sheet according to the first embodiment.
Figure 3B:
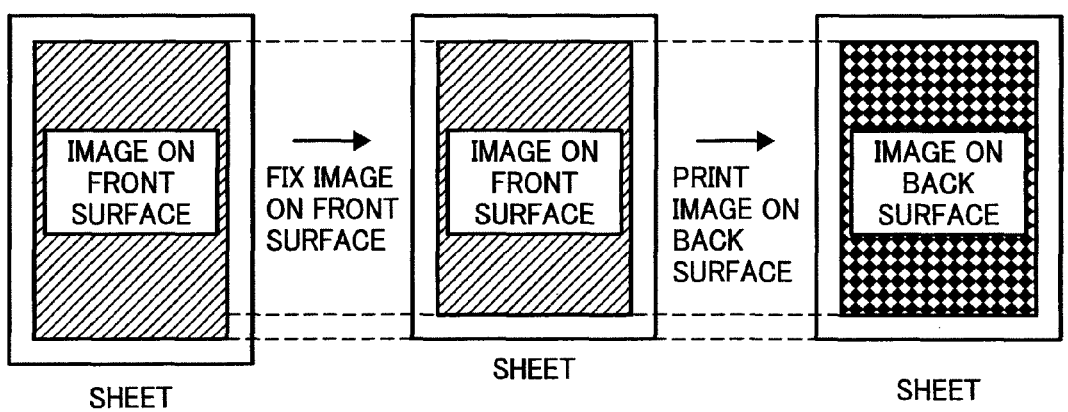

FIGS. 3A and 3B are schematic diagrams for explaining an example in which images are printed on both surfaces of a sheet according to the first embodiment. When images are printed on both surfaces of a sheet by an image forming apparatus, such as a copy machine, a problem occurs as described below. As shown in FIG. 3A, after an image is printed on one surface (e.g., the front surface) of the sheet, the image is fixed on the front surface with heat applied to the sheet. The sheet shrinks because of the applied heat. If an image is printed on the other surface (e.g., the back surface) of the shrunk sheet, the image printed on the back surface is printed relatively larger than the image printed on the front surface. In the first embodiment, to take care of this issue, as shown in FIG. 3B, after an image is printed on the front surface, a size of an image to be printed on the back surface is reduced, and the reduced image is printed on the back surface. In this manner, it is possible to make a correction for the sheet shrinkage, and to match the image sizes on the front surface and the back surface.

The optical scanning device according to the first embodiment can be effectively employed not only when printing images on both surfaces of the sheet, but also when printing two images on the same surface with a time lag. When printing two images on the same surface, the size of the second image is reduced. Specifically, before the second image is printed on the surface, certain pieces of subpixel data are deleted from image data in the sub-scanning direction, and thereby the size of the image is reduced. The reduced image is then printed on the surface. In this manner, even if the sheet shrinks when the first image is printed, it is possible to prevent occurrence of difference between the sizes of the first image and the second image printed on the sheet.

It is advantageous to form one pixel with a plurality of light beams emitted from a plurality of light sources (four light sources in the example shown in FIG. 2). This is because if a surface-emitting laser is used as the light source of the optical scanning device, an output intensity of the surface-emitting laser is lower than that of a conventional laser, and therefore, there is a possibility that sufficient light intensity to develop an image is not generated with a light beam form one light source. In other words, to generate sufficient light intensity, it is preferable to form one pixel with light beams from the light sources.

As shown in FIG. 2, three pixels P1, P2, and P3 are simultaneously scanned by light beams emitted from 12 light sources (a1 to a4, b1 to b4, and c1 to c4), i.e., one pixel is scanned by light beams from four light sources. Each of the pixels P1, P2, and P3 includes 4×4 subpixels. For example, the pixel P1 includes subpixels in which draw data or no-draw data is written, so that a timing of emitting a light beam from the light source is determined depending on whether a subpixel has the draw data or the no-draw data. Specifically, the light source emits a light beam on a draw data portion, and does not emit a light beam on a no-draw data portion. The light sources a1 to a4 emit light beams at a light emission timing 1 based on a draw pattern of the pixel P1. Because each of the pixel P2 and the pixel P3 has a draw pattern in which the draw data is written in all of the subpixels, the light sources b1 to b4 and the light sources c1 to c4 emit light beams at a light emission timing 2.

Figure 4:
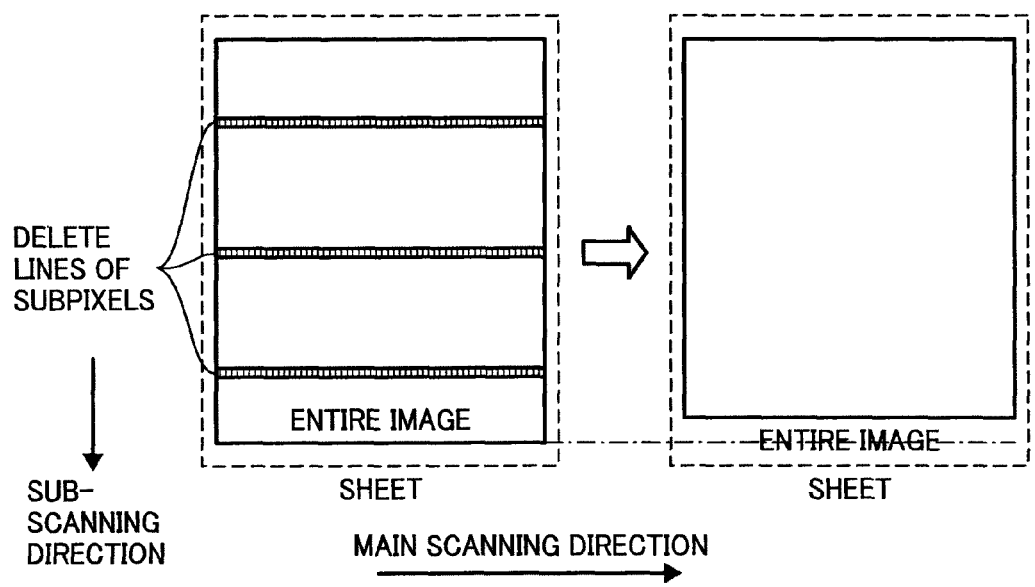
FIGS. 4 to 8 are schematic diagrams for explaining specific examples of reducing the size of the entire image according to the first embodiment.

FIGS. 4 to 8 are schematic diagrams for explaining how the size of the entire image in the sub-scanning direction can be reduced. As shown in FIG. 4, a plurality of lines of subpixels (subpixel data), each of which is smaller than one pixel, is deleted from an image at a plurality of positions in the sub-scanning direction. Because of the deletion of data, the size of the entire image shrinks in the sub-scanning direction.

Figure 5:
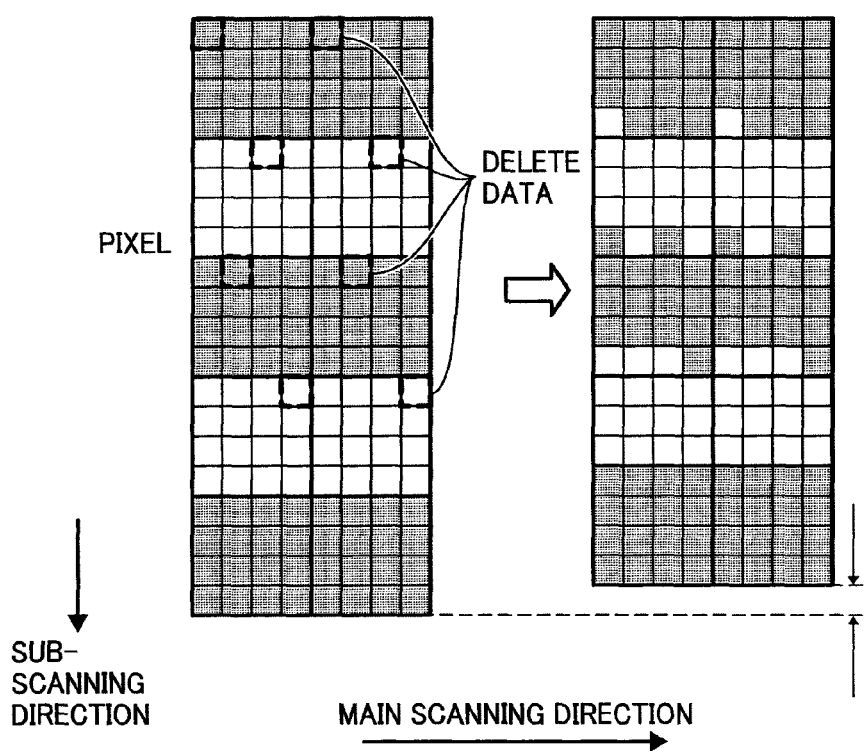
Figure 6:
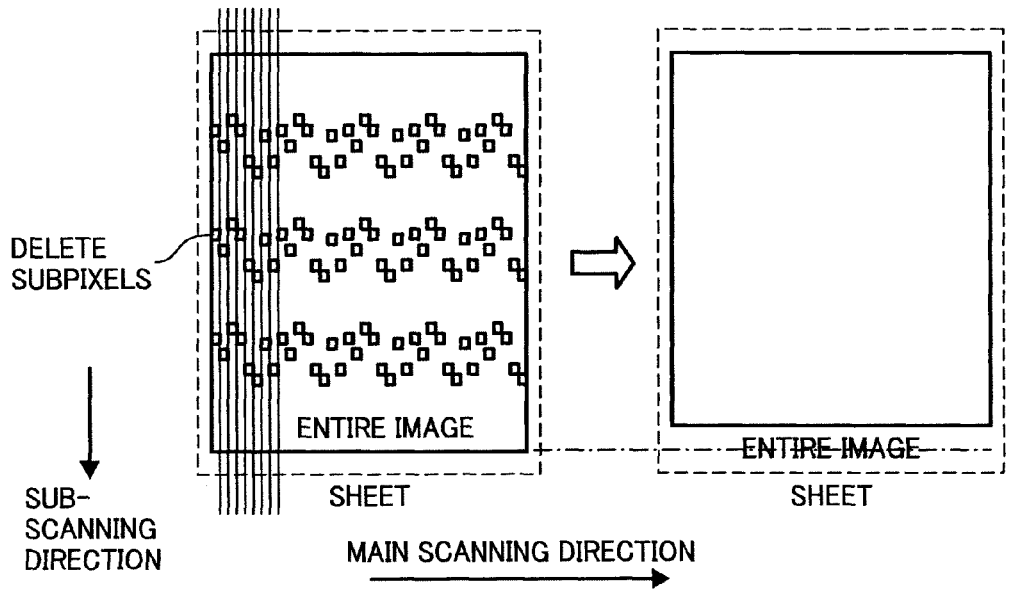

Alternatively, as shown in FIG. 5, certain subpixels (subpixel data) are deleted from an image at random positions in the sub-scanning direction. Although the deletion operation is performed on a matrix of 2×5 pixels as shown in FIG. 5, the deletion operation is actually performed on the entire image in a manner as shown in FIG. 6. In the examples shown in FIGS. 5 and 6, the subpixels deleted from the image are selected in such manner that their positions in the sub-scanning direction are random but the same number of subpixels are deleted from each column. In the example shown in FIG. 5, one subpixel is deleted from each column. Because the same number of subpixels are deleted from each column, the image does not appear uneven as a whole. As describe above, because the subpixel data is deleted from the image at random positions, degradation of the image due to the deletion can be reduced compared with the example in which the lines of subpixels with data are deleted as shown in FIG. 4.

Figure 7:
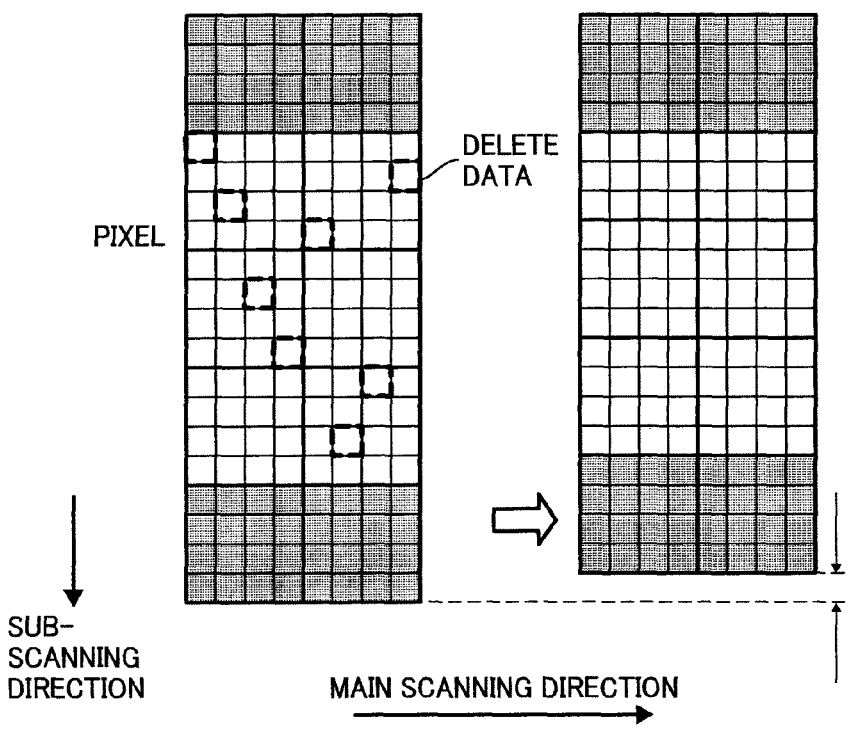

As shown in FIG. 7, certain pieces of no-draw data (no-image data portion) written as subpixel data are deleted from an image at random positions in the sub-scanning direction. If the image to be drawn contains quit a bit of no-image data (no-draw data), the no-image data (a subpixel with no-draw data) is deleted from the image, so that degradation of the image due to the deletion can be reduced.

Figure 8:
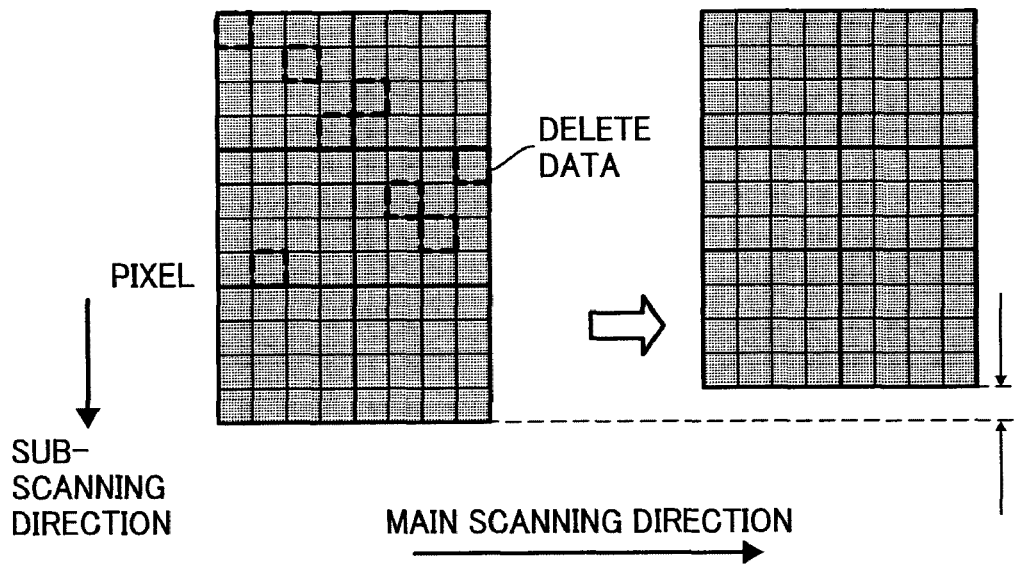

As shown in FIG. 8, certain pieces of draw data (image data portion) written as subpixel data are deleted from an image at random positions in the sub-scanning direction. If the image to be drawn contains quite a bit of image data (draw data), the image data (a subpixel with draw data) is deleted from the image, so that degradation of the image due to the deletion can be reduced. In the example shown in FIG. 8, the image is evenly painted with a single color.

A subpixel with draw data and a subpixel with no-draw data could be selectively deleted from an image. Specifically, if there are many subpixels with draw data around a subpixel to be deleted, a subpixel with draw data is deleted from the image. On the other hand, if there are many subpixels with no-draw data around a subpixel to be deleted, a subpixel with no-draw data is deleted from the image. In this manner, degradation of the image can be decreased when the size of the image is reduced in the sub-scanning direction.

Figure 9:
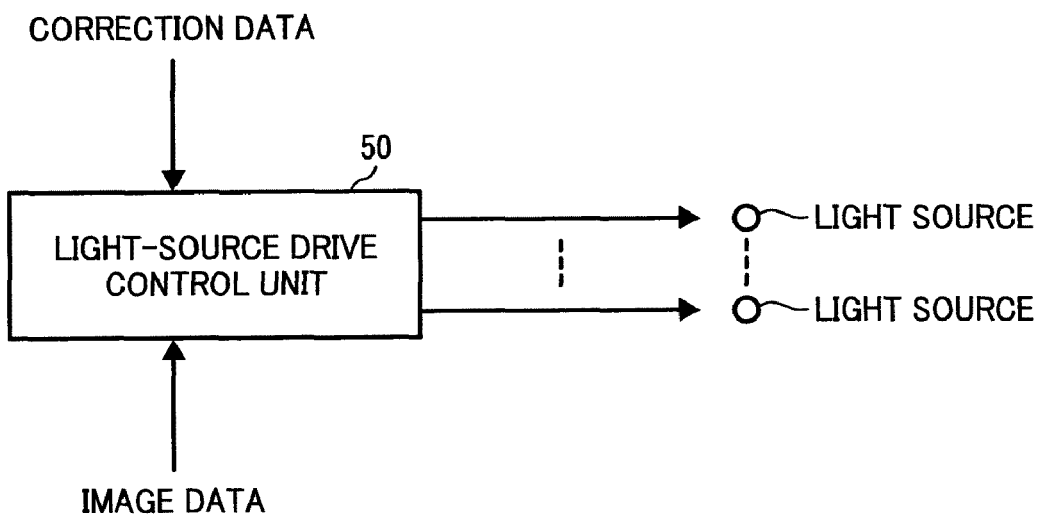
FIG. 9 is a specific example of a light-source drive control unit of the optical scanning device.

FIG. 9 is a specific example of the light-source drive control unit 50. For example, when printing images on both surfaces of a sheet at the first and the second printing operations, the light-source drive control unit 50 receives correction data indicative of a degree of shrinkage of the sheet due to heat applied at the first printing operation (e.g., operation of printing an image on one surface of the sheet). The light-source drive control unit 50 then deletes a subpixel with data (draw data or no-draw data) from image data based on the correction data in such a manner described with reference to FIGS. 4 to 8.

The correction data can be obtained in various manners. For example, a degree of shrinkage of a sheet due to heat applied at printing operation is measured in advance in each type of printers, and the measured degree of shrinkage is prepared as the correction data. Alternatively, the size of a sheet is detected by using a sensor or the like each time an image is printed on one surface of a sheet (the size of the first sheet is detected if images are printed on a plurality of sheets), and the detected size is prepared as the correction data.

Figure 10:
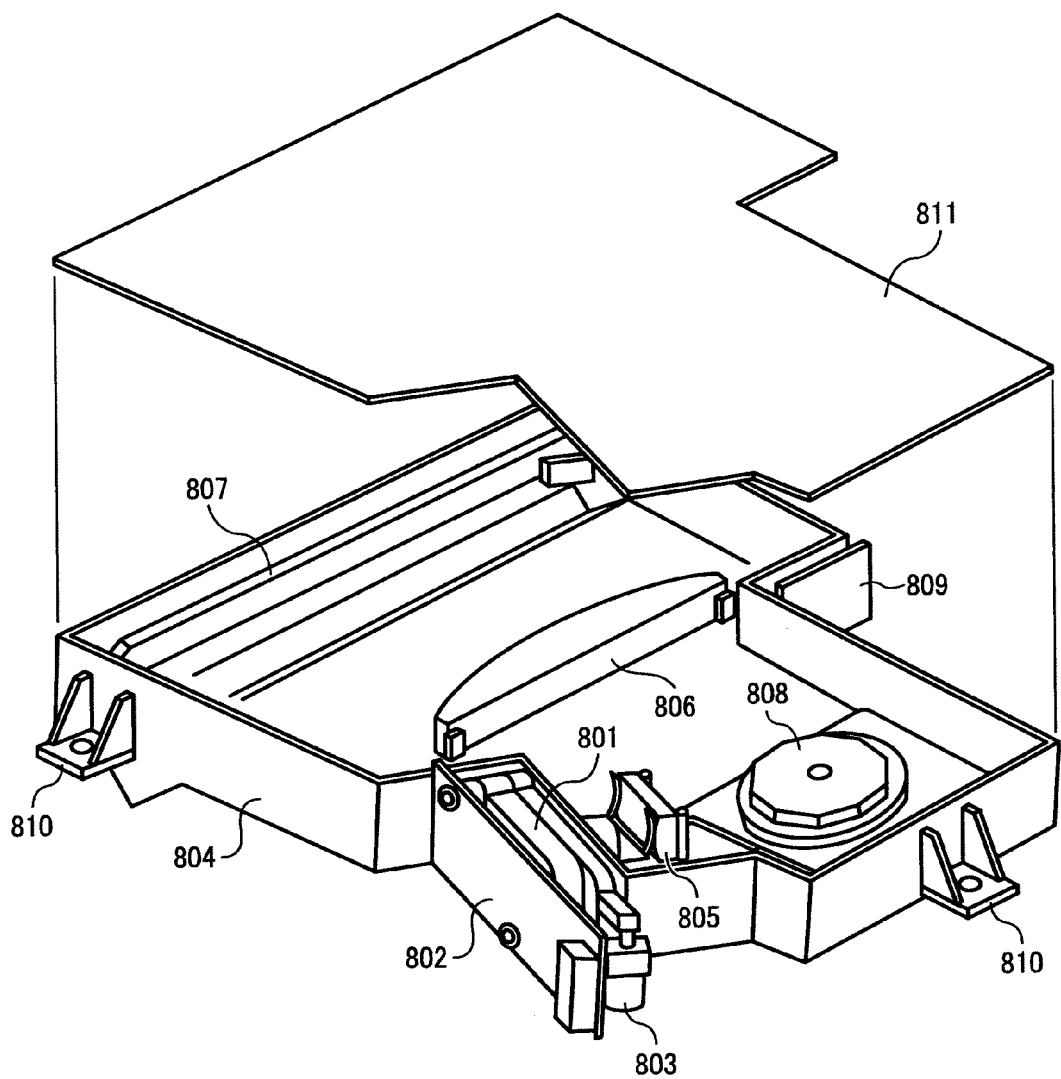
FIG. 10 is an example of an image forming apparatus including the optical scanning device.

FIG. 10 is an example of an image forming apparatus including the optical scanning device according to the first embodiment. A printed circuit board 802 is mounted on the back surface of a laser diode unit 801. A driving circuit and a pixel-clock generating device are arranged on the printed circuit board 802. The driving circuit controls a laser diode included in the laser diode unit 801. The laser diode unit 801 is attached on the outer surface of a wall of an optical housing 804 with a spring (not shown). The wall of the optical housing 804 is at a right angle to an optical axis. A tilt of the laser diode unit 801 is adjusted and maintained by an adjustment screw 803. The adjustment screw 803 is screwed on a protruding portion (not shown) formed on the wall of the optical housing 804. The optical housing 804 contains a cylinder lens 805, a polygon motor 808 that rotates a polygon mirror (not shown), an fθ lens 806, a toroidal lens (not shown), and a reflecting mirror 807. The cylinder lens 805, the polygon motor 808, the fθ lens 806, the toroidal lens, and the reflecting mirror 807 are aligned and supported in the optical housing 804. A synchronous detecting sensor (not shown) is mounted on a printed circuit board 809. The printed circuit board 809 is attached on the outer surface of the wall of the optical housing 804 in the same manner as the laser diode unit 801. The upper side of the optical housing 804 is closed by a cover 811. A plurality of attachment portions 810 is formed on the wall of the optical housing 804 in a protruding manner, and is fixed to frame members (not shown) of the image forming apparatus with a screw (not shown).

The laser diode array (specifically, a surface-emitting laser (a surface-emitting laser array)) including the light sources as shown in FIG. 2 can be used as a laser diode of the laser diode unit 801. When a laser diode (a surface-emitting laser) of the laser diode unit 801 emits a light beam, the light beam is projected through the cylinder lens 805, and is then deflected by the polygon mirror that is rotating. The deflected light beam passes through the fθ lens 806, the toroidal lens, and the reflecting mirror 807, and then illuminates a photosensitive drum (not shown). A scanning light beam is reflected by an unscanned area on the photosensitive drum or an intermediate mirror, and such a reflected light beam is detected by a sensor. The sensor detects a signal from the reflected light beam. Specifically, a synchronous detecting sensor detects a time interval between two points along the main scanning direction that is a scanning direction in accordance with rotation of the polygon mirror. Furthermore, a position detecting sensor detects a degree of positional deviation in the sub-scanning direction that is rotated by 90 degrees with respect to the main scanning direction. A detected value is used to control the laser diode, or is fed back to a modulation circuit or a modulated-data generating unit that is arranged prior to the modulation circuit, so that a position of a pixel can be corrected.

Figure 11:
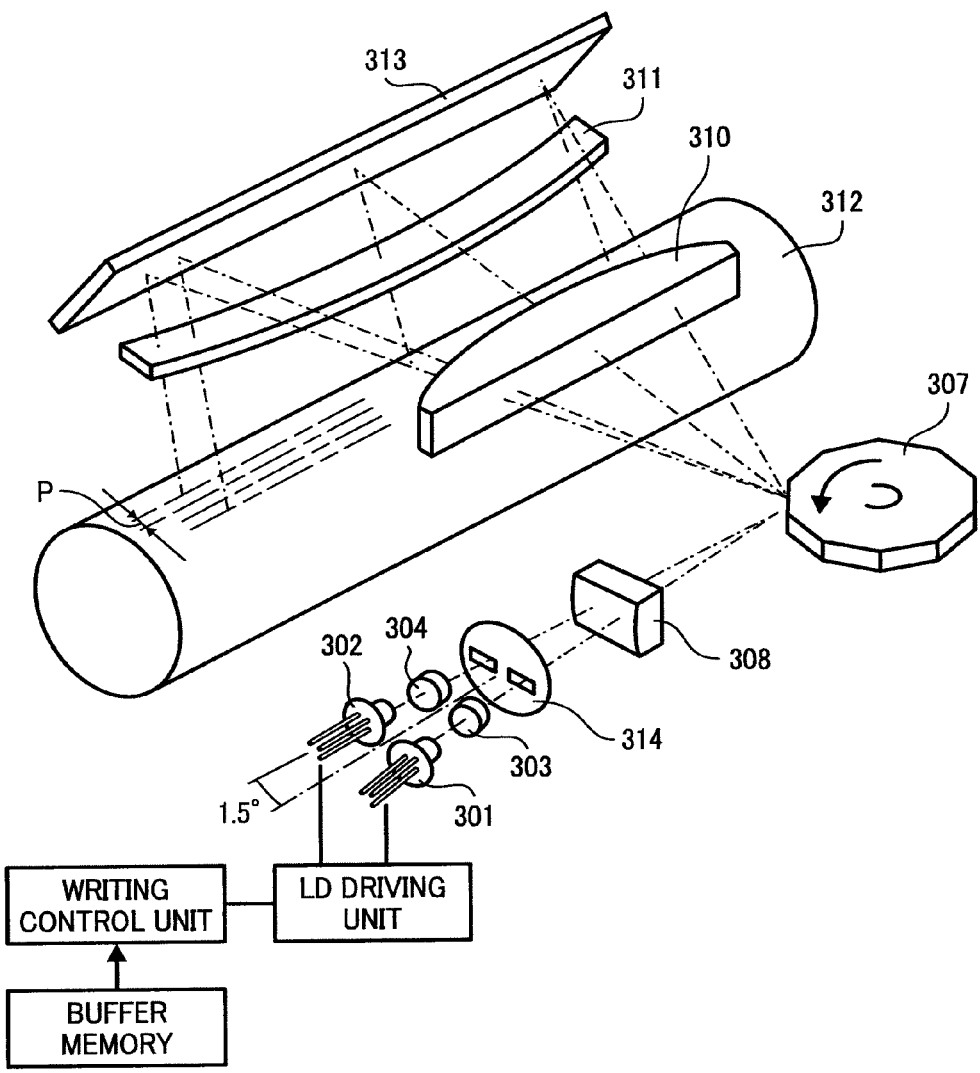
FIG. 11 is an example of a multi-beam scanning device according to the first embodiment.

FIG. 11 is an example of a multi-beam scanning device according to the first embodiment. The multi-beam scanning device includes two laser diode arrays 301, 302, each having four channels (having eight light sources). Two light sources are monolithically arranged with an interval ds of 25 μm in each of the laser diode arrays 301, 302.

The laser diode arrays 301, 302 are arranged in a manner described below. The optical axes of the laser diode arrays 301, 302 match the optical axes of collimating lenses 303, 304. Projection angles of light beams from the laser diode arrays 301, 302 are symmetric to each other with respect to the main scanning direction. The projection angle of the light beam is 1.5 degrees. Projection axes of the light beams from the laser diode arrays 301, 302 intersect with each other at a point on which the light beams are reflected by a polygon mirror 307. The light beams are emitted from the laser diode arrays 301, 302, and collimated by the collimating lenses 303, 304 and collimating lenses 314. The light beams are projected through a cylinder lens 308, and collectively deflected by the polygon mirror 307. The deflected light beams are then projected onto a photosensitive element 312 through an fθ lens 310, a toroidal lens 311, and a reflecting mirror 314, so that image is formed on the photosensitive element 312. A buffer memory stores therein print data for one line of each of the four light sources. The print data for the light sources is read from the buffer memory while the light beams from the light sources are deflected by one surface of the polygon mirror 307, and therefore the print data is recorded on the photosensitive element 312 by four lines at the same time. A writing control unit sends a control signal to a laser diode (LD) driving unit based on the print data stored in the buffer memory. The LD driving unit switches the laser diode arrays 301, 302 ON/OFF based on the control signal. The reference mark P indicates a scanning line pitch on the photosensitive element 312.

To correct a difference in an optical scanning length and a magnifying power that occur due to a wavelength error in each of the laser diodes for generating multiple light beams, a pixel clock is phase-shifted. Thereby, the difference in the optical scanning length is corrected with the accuracy obtained by the phase shift, so that variation of scanning light beams can be reduced.

Figure 12:
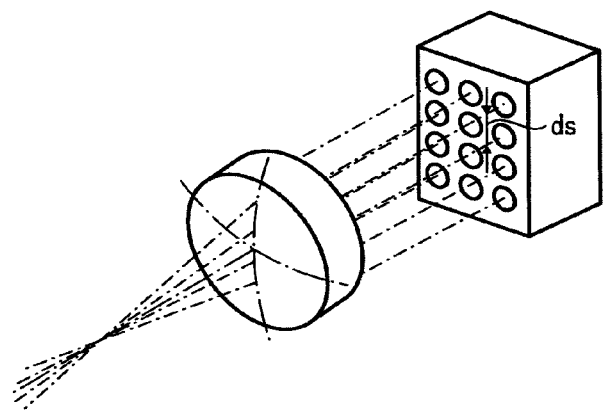
FIG. 12 is an example of the laser diode unit.

FIG. 12 is an example of the laser diode unit 1001. In this example, a two-dimensional surface-emitting laser array is used in the laser diode unit 1001. The two-dimensional surface-emitting laser array includes a plurality of surface-emitting lasers that are arranged in a two-dimensional array. The two-dimensional surface-emitting laser array includes twelve light sources (surface-emitting lasers), i.e., three light sources in the horizontal direction and four in the vertical direction.

Figure 13:
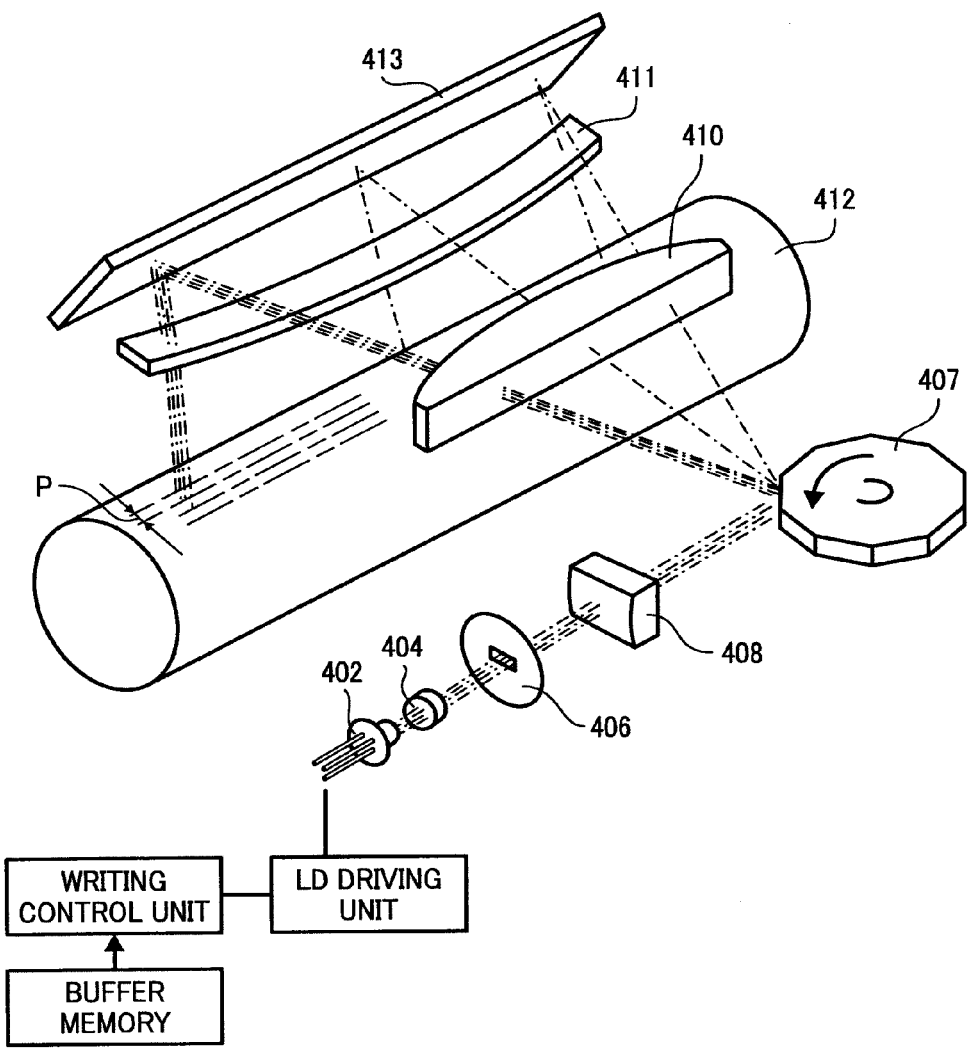
FIG. 13 is an example of the multi-beam scanning device.

FIG. 13 is an example of the multi-beam scanning device (multi-beam optical system) in which a surface-emitting laser array (VCSEL array) 402 is used in the laser diode unit 1001. The multi-beam scanning device shown in FIG. 13 includes the VCSEL array 402 instead of the two laser diode arrays 301, 302 shown in FIG. 11.

A plurality of light beams are emitted from the VCSEL array 402, and projected through a collimating lens 404, an aperture 406, and a cylinder lens 408. The light beams are then collectively deflected by a polygon mirror 407, and projected onto a photosensitive element 412 serving as a scanned surface through an fθ lens 410, a toroidal lens 411, and a reflecting mirror 413. Thus, an image is produced on the photosensitive element 412. A buffer memory stores therein print data for one line of each light source. The print data for the light sources is read from the buffer memory while the light beams from the light sources are deflected by one surface of the polygon mirror 407, and therefore the print data is recorded on the photosensitive element 412 by a plurality of lines at the same time. A writing control unit sends a control signal to a laser diode (LD) driving unit based on the print data stored in the buffer memory. The LD driving unit switches the VCSEL array 402 ON/OFF based on the control signal. The reference mark P indicates a scanning line pitch on the photosensitive element 412.

To correct a difference in an optical scanning length or a magnifying power that occur due to a wavelength error in each of the laser diodes for generating multiple light beams, phase shift is performed on a pixel clock. Thereby, the difference in the optical scanning length is corrected with the accuracy obtained by the phase shift, so that variation of scanning light beams can be reduced.

Figure 14:
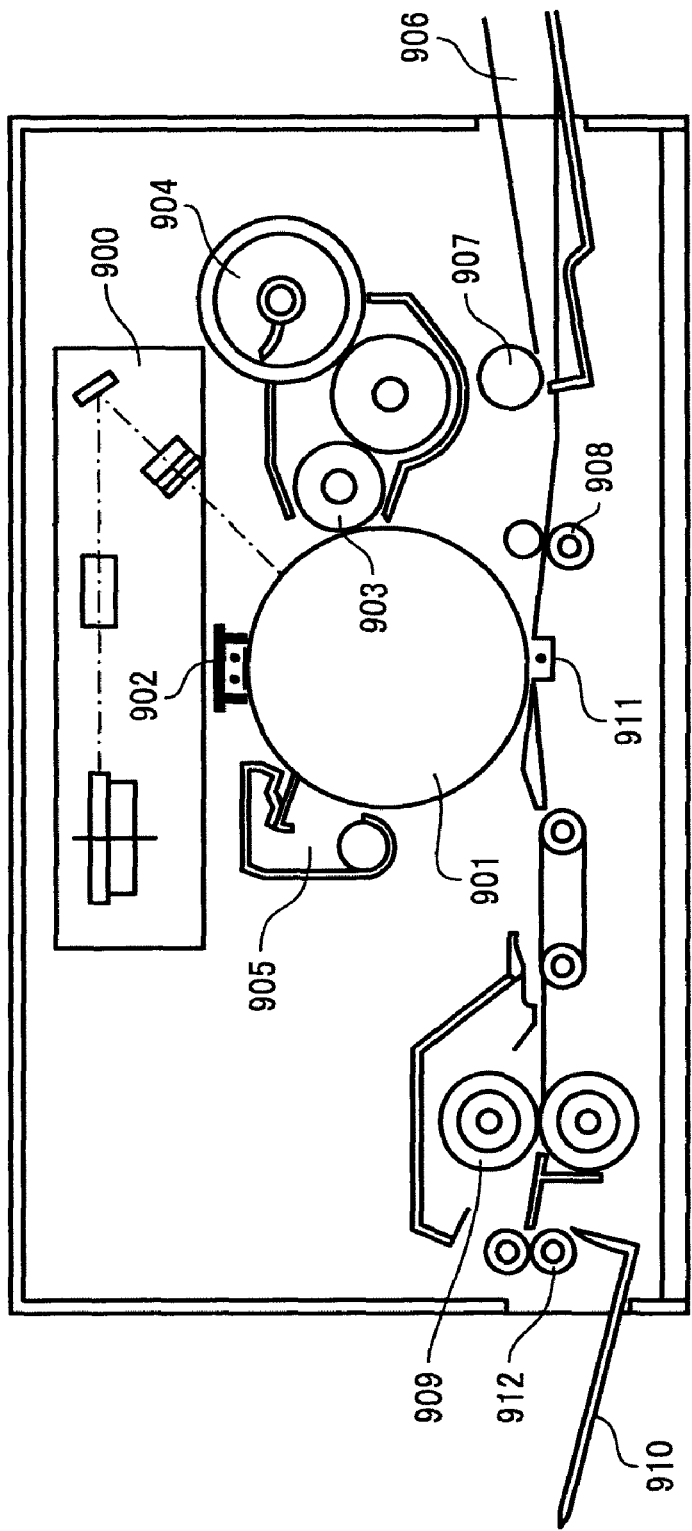
FIG. 14 is an example of a configuration of the image forming apparatus.

FIG. 14 is an example of a configuration of the image forming apparatus. A photosensitive drum 901 is a surface to be scanned. A charger 902 charges the photosensitive drum 901 to a high voltage. An optical scanning device 900 forms an electrostatic latent image on the photosensitive drum 901. A developing roller 903 attracts charged toner to the photosensitive drum 901, thereby developing the electrostatic latent image. A toner cartridge 904 supplies toner to the developing roller 903. A cleaning case 905 removes remaining toner from the photosensitive drum 901, and stores therein the removed toner. The charger 902, the developing roller 903, the toner cartridge 904, and the cleaning case 905 are arranged around the photosensitive drum 901. As described above, the electrostatic latent images are formed on the photosensitive drum 901 by a plurality of lines at the same time while the light beams are deflected by one surface of the polygon mirror. A paper-feeding tray 906 feeds a recording sheet through a paper-feeding roller 907, and a pair of registration rollers 908 feed the recording sheet to the photosensitive drum 901 in accordance with a timing of forming an electrostatic latent image in the sub-scanning direction. When the recording sheet passes through the photosensitive drum 901, a transfer charger 911 transfers the toner to the recording sheet. A fixing roller 909 fixes the toner to the recording sheet, and then a paper-discharging roller 912 discharges the recording sheet to a catch tray 910. The optical scanning device of the present invention is applied to the optical scanning device 900, so that it is possible to correct a position of a dot with high accuracy, and obtain an image with high quality.

Figure 15:
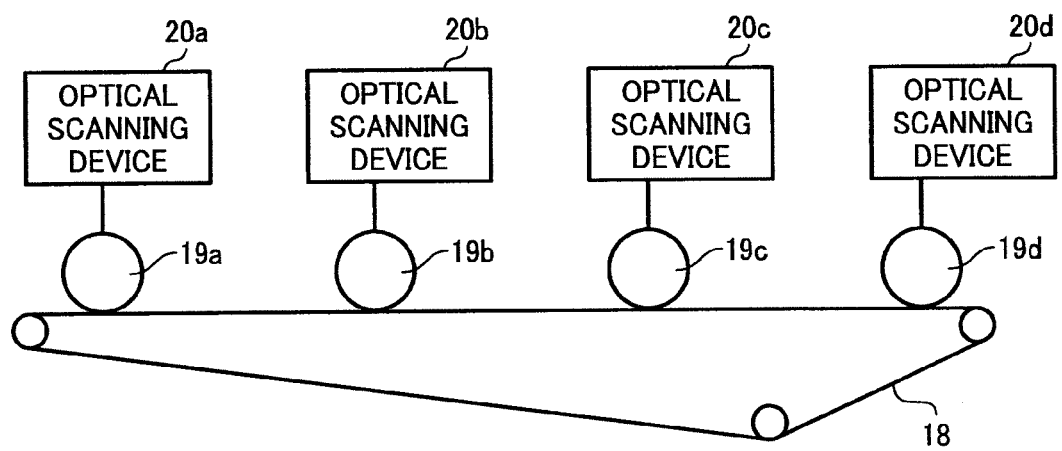
FIG. 15 is an example of a color image forming apparatus according to the first embodiment.

Furthermore, the image forming apparatus explained above can be a color image forming apparatus. FIG. 15 is an example of a tandem-type color image forming apparatus including a plurality of photosensitive elements. The tandem-type color image forming apparatus includes a dedicated photosensitive element for each of four colors of cyan, magenta, yellow and black. In an optical scanning system, electrostatic latent images are formed on the photosensitive elements by using separate optical paths that correspond to the photosensitive elements. Therefore, positional deviation of a dot occurs in the main scanning direction on each of the photosensitive elements due to a different characteristic.

As shown in FIG. 15, a transfer belt is denoted by a reference numeral 18, the photosensitive elements corresponding to the four colors by reference numerals 19a, 19b, 19c, 19d, and optical scanning devices corresponding to the four colors by reference numerals 20a, 20b, 20c, 20d.

The optical scanning device explained above is applied to the optical scanning devices 20a, 20b, 20c, and 20d. Thus, even if a sheet shrinks due to heat applied when a first image is printed on one surface of the sheet, it is possible to match the image sizes on both surfaces of the sheet.

Figure 16:
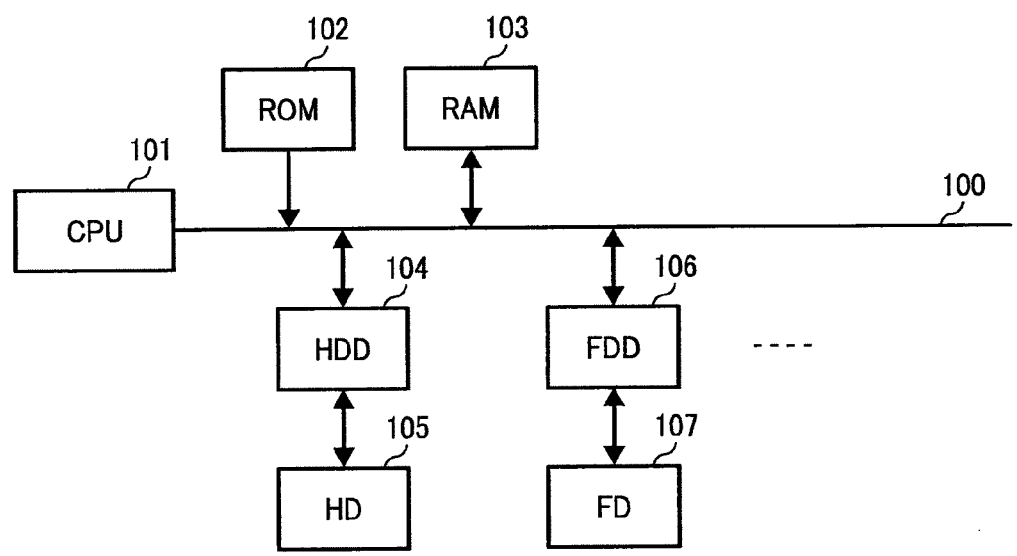
FIG. 16 is a block diagram of a hardware configuration of the light-source drive control unit.

FIG. 16 is a block diagram of a hardware configuration of the light-source drive control unit 50. The light-source drive control unit 50 includes a central processing unit (CPU) 101, a read-only memory (ROM) 102, a random access memory (RAM) 103, a hard disk drive (HDD) 104, a hard disk (HD) 105, and a flexible disk drive (FDD) 106. The CPU 101, the ROM 102, the RAM 103, the HDD 104, the HD 105, and the FDD 106 are connected to one another by a bus 100.

The CPU 101 controls the optical scanning device. The ROM 102 stores therein a control program. The RAM 103 is used as a work area of the CPU 101. The HDD 104 controls reading/writing of data from/to the HD 105 under the control of the CPU 101. The HD 105 stores therein data written in accordance with the control of the HDD 104. The FDD 106 controls reading/writing of data from/to a FD 107 under the control of the CPU 101. The FD 107 is configured to be removable. The FD 107 stores therein data written in accordance with the control of the FDD 106.

Processing of the light-source drive control unit 50 can be provided in a form of a computer program executable by a computer (for example, the CPU 101).

The computer program executable by the computer for implementing the processing of the light-source drive control unit 50 is recorded in a recording medium readable by a computer, such as the HD 105, a floppy (registered mark) disk, a compact disk-read only memory (CD-ROM), a magnetooptic disk (MO), and a digital versatile disc (DVD). The computer program is read from the recording medium by the computer, and the read computer program is executed. The computer program recorded in the recording medium can be distributed via a network, such as the Internet.

In a second embodiment according to the present invention, an optical scanning device, an image forming apparatus, and a hardware configuration of the optical scanning device are the same as the optical scanning device (FIGS. 1, 2, 9 to 13), the image forming apparatus (FIGS. 14, 15), and the hardware configuration of the optical scanning device according to the first embodiment, and therefore a description thereof is omitted in the second embodiment.

The optical scanning device in the second embodiment scans a target surface in a main scanning direction with a plurality of light beams based on image data. The optical scanning device includes a plurality of light sources that emits the light beams, and the light-source drive control unit 50 that controls the light sources. The light sources are arranged at different positions in a sub-scanning direction. The image data includes a plurality of pixels, and one of the pixels includes a plurality of subpixels. One line of the subpixels is formed with a light beam emitted from a corresponding one of the light sources. The light-source drive control unit deletes certain subpixels from the image data in accordance with predetermined correction data, and shifts remaining subpixels in the sub-scanning direction in position of deleted subpixels, thereby obtaining reduced image data. The light-source drive control unit then controls the light sources based on the reduced image data.

As described above, when images are printed on both surfaces of a sheet by an image forming apparatus, such as a copy machine, a problem occurs as shown in FIG. 3A. Specifically, after an image is printed on one surface (e.g., the front surface) of the sheet, the image is fixed on the front surface with heat applied to the sheet. The sheet shrinks because of the applied heat. If an image is printed on the other surface (e.g., the back surface) of the shrunk sheet, the image printed on the back surface is larger than the image printed on the front surface.

In the second embodiment, as shown in FIG. 3B, before an image is printed on the front surface, the size of the image is enlarged, and the enlarged image is printed on the front surface. In this manner, it is possible to make a correction for the sheet shrinkage, and to match the image sizes on the front surface and the back surface. The optical scanning device can be applied not only when the images are printed on both surfaces of the sheet, but also when a first image is printed on one surface, and subsequently a second image is printed on the same surface. In such a case, the size of the first image is enlarged. Specifically, before the first image is printed on the surface, subpixel data is added to image data in the sub-scanning direction, and thereby the size of the image is enlarged. The enlarged image is then printed on the surface. In this manner, even if the sheet shrinks when the first image is printed on the surface, it is possible to prevent the difference of the sizes of the first image and the second image printed on the sheet.

FIGS. 18 to 22 are schematic diagrams for explaining specific examples of enlarging the size of the entire image in the sub-scanning direction according to the second embodiment.

Figure 18:
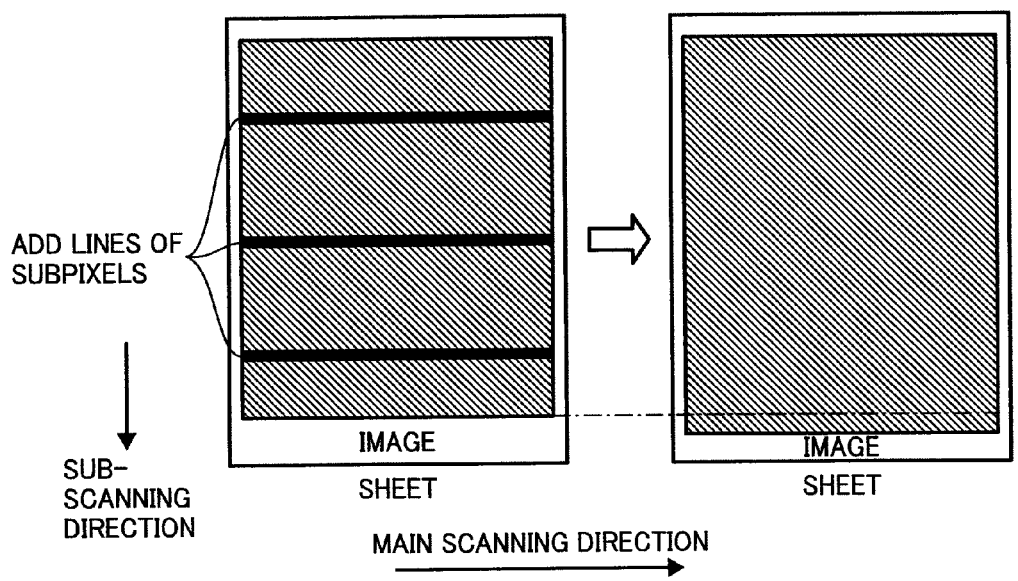
FIGS. 18 to 22 are schematic diagrams for explaining specific examples of enlarging the size of the entire image according to a second embodiment of the present invention.

As shown in FIG. 18, a plurality of lines of subpixels (subpixel data) is added to an image at a plurality of positions in the sub-scanning direction. One subpixel is smaller than one pixel. The size of the entire image is enlarged in the sub-scanning direction.

Figure 19:
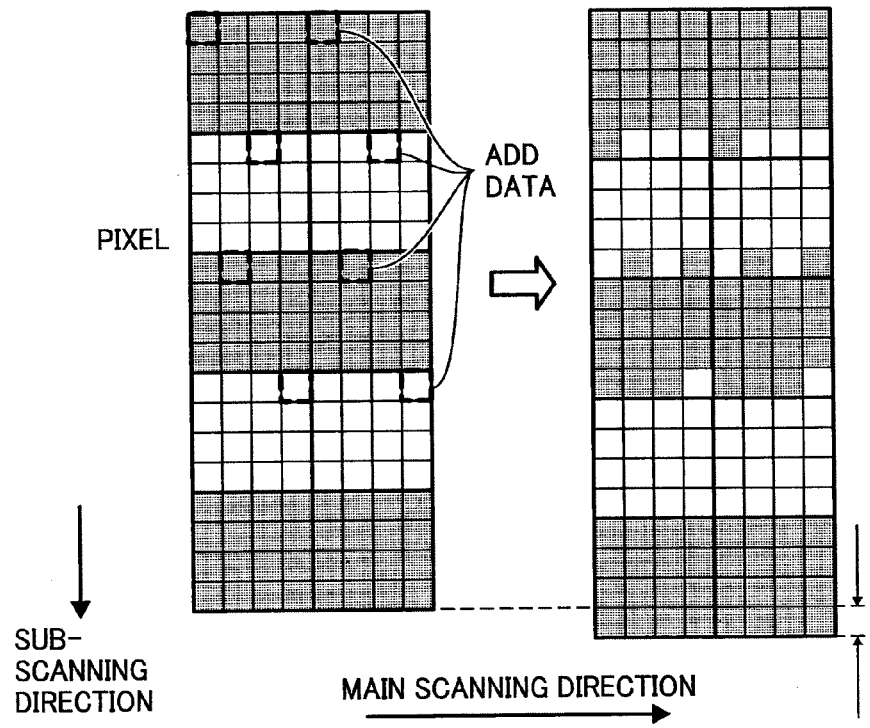
Figure 20:
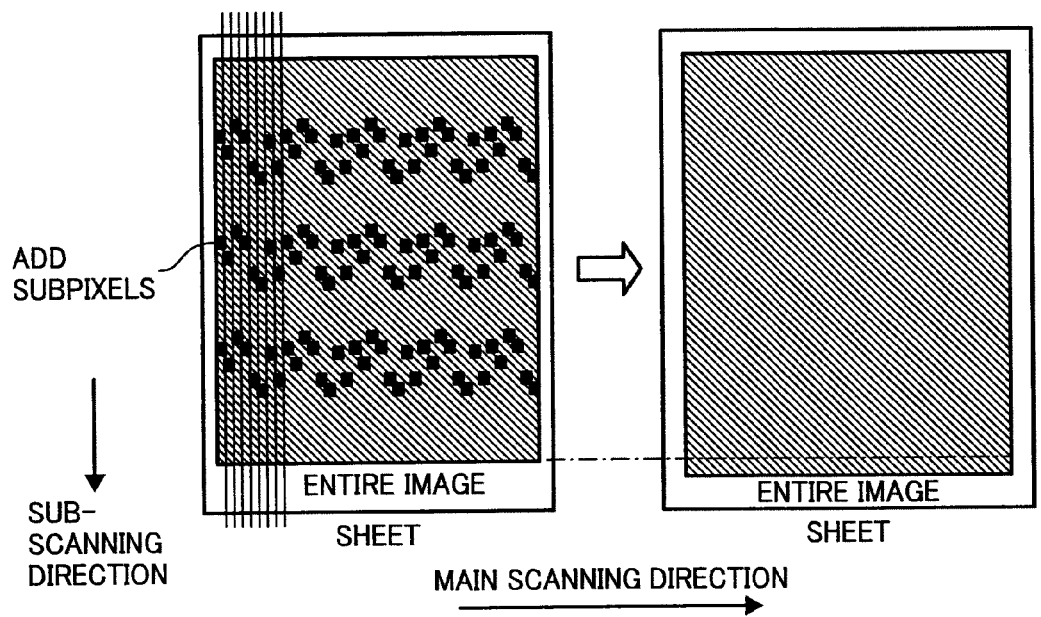

As shown in FIG. 19, subpixels (subpixel data) are added to an image at random positions in the sub-scanning direction. Although the addition operation is performed on a matrix of 2×5 pixels as shown in FIG. 19, the addition operation is actually performed on the entire image in a manner as shown in FIG. 20. In the examples shown in FIGS. 19 and 20, the subpixels added to the image are selected in such manner that their positions in the sub-scanning direction are random but the same number of subpixels is to be added to each column. As a result, the image does not appear uneven as a whole. As describe above, because the subpixel data is added to the image at random positions, deterioration of the image due to the addition can be reduced compared with the example in which the lines of subpixels with data are added as shown in FIG. 18.

Figure 21:
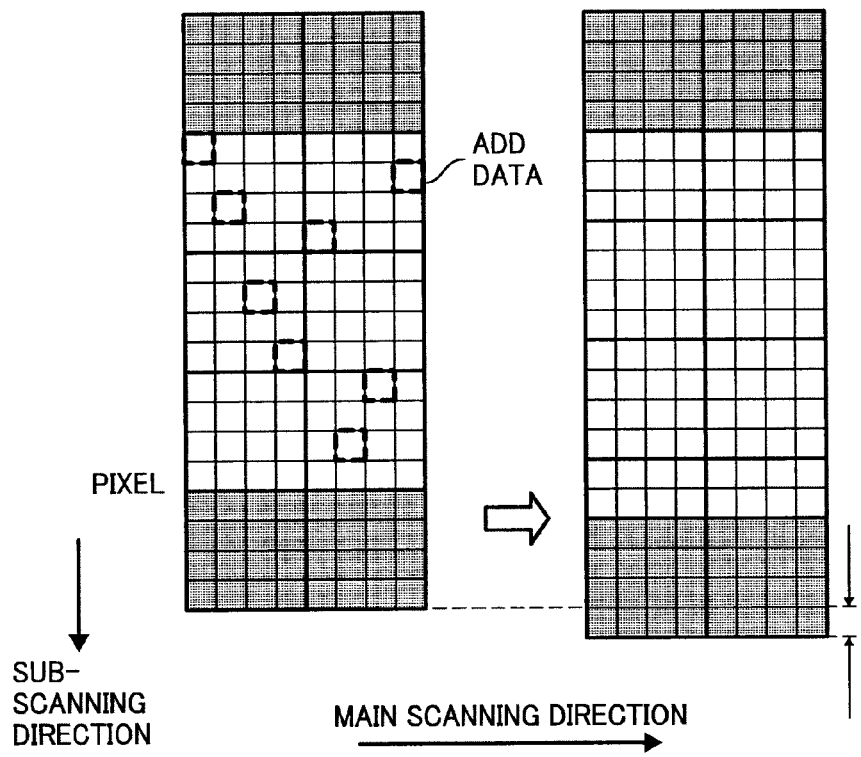

As shown in FIG. 21, no-draw data (no-image data portion) to be written as subpixel data is added to the image at random positions in the sub-scanning direction. If the image to be drawn contains much no-image data (no-draw data), the no-image data (a subpixel with the no-draw data) is added to the image, so that deterioration of the image due to the addition can be reduced.

Figure 22:
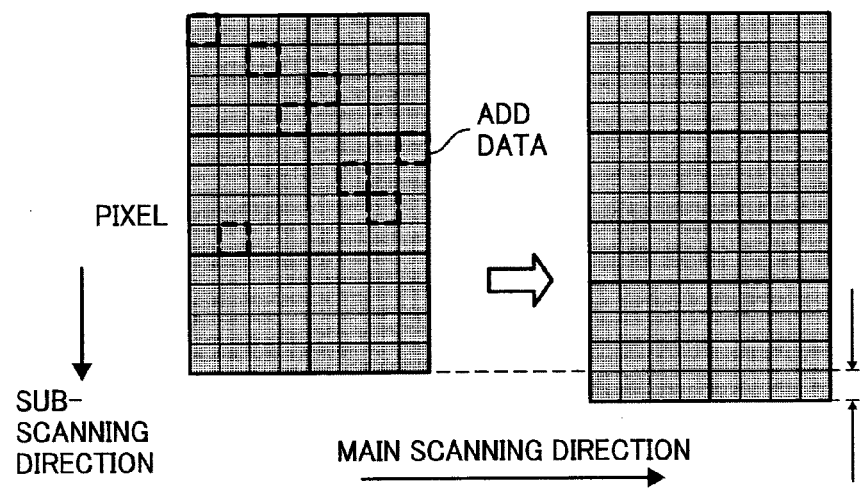

As shown in FIG. 22, draw data (image data portion) to be written as subpixel data is added to an image at random positions in the sub-scanning direction. If the image to be drawn contains much image data (draw data), the image data (a subpixel with draw data) is added to the image, so that deterioration of the image due to the addition can be reduced. In the example shown in FIG. 22, the image is evenly painted with a single color.

A subpixel with draw data and a subpixel with no-draw data are selectively added to an image. Specifically, if there are many subpixels with draw data around a subpixel to be added, a subpixel with draw data is added to the image. On the other hand, if there are many subpixels with no-draw data around a subpixel to be added, a subpixel with no-draw data is added to the image. In this manner, deterioration of the image can be decreased when the size of the image is enlarged in the sub-scanning direction.

As described above, the specific example of the light-source drive control unit 50 is shown in FIG. 9. For example, when images are printed on both surfaces of a sheet at the first and the second printing operations, the light-source drive control unit 50 receives correction data on a degree of shrinkage of the sheet due to heat applied at the first printing operation (e.g., operation of printing an image on one surface of the sheet). The light-source drive control unit 50 then adds a subpixel with data (draw data or no-draw data) to the image data based on the correction data in such a manner described with reference to FIGS. 18 to 22.

The correction data is obtained, for example, in a manner described below. A degree of shrinkage of a sheet due to heat applied at printing operation is measured in advance in each type of printers, and the measured degree of shrinkage is prepared as the correction data. Alternatively, the size of a sheet is detected by using a sensor or the like each time an image is printed on one surface of a sheet (the size of the first sheet is detected if images are printed on a plurality of sheets), and the detected size is prepared as the correction data.

In the second embodiment, processing of the light-source drive control unit 50 can be provided in a form of a computer program executable by a computer (for example, the CPU 101).

In the second embodiment, the computer program executable by the computer for implementing the processing of the light-source drive control unit 50 is recorded in a recording medium readable by a computer, such as the HD 105, a floppy (registered mark) disk, a CD-ROM, a MO, and a DVD. The computer program is read from the recording medium by the computer, and the read computer program is executed. The computer program recorded in the recording medium can be distributed via a network, such as the Internet.

The image forming apparatus can be used as a laser printer, a digital copy machine, or a multifunction product including functions of the laser printer or the digital copy machine.

According to an aspect of the present invention, even if a sheet shrinks due to heat applied when an image is printed on a front surface of the sheet, it is possible to match the sizes of images printed on the front surface and the back surface.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device that scans a target surface in a main scanning direction with a plurality of light beams based on image data, the optical scanning device comprising:
   a plurality of light sources that is arranged at different positions in a sub-scanning direction, and emits the light beams based on the image data; and
   a light-source drive control unit that
      divides each pixel of the image data into a plurality of subpixels;
      deletes certain subpixels from the image data in accordance with predetermined correction data;
      shifts remaining subpixels in the sub-scanning direction in position of deleted subpixels thereby obtaining reduced image data; and
      controls the light sources based on the reduced image data in such a manner that one line of the subpixels is formed with a light beam emitted from a corresponding one of the light sources.

2. The optical scanning device according to claim 1, wherein, when deleting subpixels from the image data, the light-source drive control unit deletes a line of subpixels from the image data, and shifts remaining subpixels in the sub-scanning direction, thereby obtaining the reduced image data.

3. The optical scanning device according to claim 1, wherein, when deleting subpixels from the image data, the light-source drive control unit randomly deletes subpixels from the image data, and shifts remaining subpixels in the sub-scanning direction, thereby obtaining the reduced image data.

4. The optical scanning device according to claim 3, wherein, when deleting subpixels from the image data, the light-source drive control unit randomly deletes subpixels with no-draw data from the image data, and shifts remaining subpixels in the sub-scanning direction, thereby obtaining the reduced image data.

5. The optical scanning device according to claim 3, wherein, when deleting subpixels from the image data, the light-source drive control unit randomly deletes subpixels with draw data from the image data, and shifts remaining subpixels in the sub-scanning direction, thereby obtaining the reduced image data.

6. The optical scanning device according to claim 3, wherein the light-source drive control unit
   has a function of switching between two deleting policies, a first deleting policy for deleting a subpixel with draw data from the image data, and a second deleting policy for deleting a subpixel with no-draw data from the image data; and
   deletes certain subpixels according to either one of the two deleting policies, and shifts remaining subpixels in the sub-scanning direction, thereby obtaining the reduced image data.

7. The optical scanning device according to claim 1, wherein when a first image data is printed on a surface of a sheet, and subsequently a second image data is printed on the surface, the light-source drive control unit deletes certain subpixels from the second image data, and shifts remaining subpixels in the sub-scanning direction, thereby obtaining the reduced image data.

8. The optical scanning device according to claim 1, wherein the light source is a surface-emitting laser.

9. An image forming apparatus comprising an optical scanning device according to claim 1.

10. An optical scanning device that scans a target surface in a main scanning direction with a plurality of light beams based on image data, the optical scanning device comprising:
    a plurality of light sources that is arranged at different positions in a sub-scanning direction, and emits the light beams based on the image data; and
    a light-source drive control unit that
       divides each pixel of the image data into a plurality of subpixels;
       adds certain subpixels in the image data in accordance with predetermined correction data;
       shifts remaining subpixels in the sub-scanning direction in position of deleted subpixels thereby obtaining enlarged image data; and
       controls the light sources based on the enlarged image data in such a manner that one line of the subpixels is formed with a light beam emitted from a corresponding one of the light sources.

11. The optical scanning device according to claim 10, wherein, when adding subpixels in the image data, the light-source drive control unit ads a line of subpixels in the image data, and shifts remaining subpixels in the sub-scanning direction, thereby obtaining the enlarged image data.

12. The optical scanning device according to claim 10, wherein, when adding subpixels in the image data, the light-source drive control unit randomly adds subpixels in the image data, and shifts remaining subpixels in the sub-scanning direction, thereby obtaining the enlarged image data.

13. The optical scanning device according to claim 12, wherein, when adding subpixels in the image data, the light-source drive control unit randomly adds subpixels with no-draw data in the image data, and shifts remaining subpixels in the sub-scanning direction, thereby obtaining the enlarged image data.

14. The optical scanning device according to claim 12, wherein, when adding subpixels in the image data, the light-source drive control unit randomly adds subpixels with draw data in the image data, and shifts remaining subpixels in the sub-scanning direction, thereby obtaining the enlarged image data.

15. The optical scanning device according to claim 12, wherein the light-source drive control unit
    has a function of switching between two adding policies, a first adding policy for adding a subpixel with draw data in the image data, and a second adding policy for adding a subpixel with no-draw data in the image data; and
    adds certain subpixels according to either one of the two adding policies, and shifts remaining subpixels in the sub-scanning direction, thereby obtaining the enlarged image data.

16. The optical scanning device according to claim 10, wherein when a first image data is printed on a surface of a sheet, and subsequently a second image data is printed on the surface, the light-source drive control unit adds certain subpixels in the second image data, and shifts remaining subpixels in the sub-scanning direction, thereby obtaining the enlarged image data.

17. The optical scanning device according to claim 10, wherein the light source is a surface-emitting laser.

18. An image forming apparatus comprising an optical scanning device according to claim 10.

19. An optical scanning method of scanning a target surface in a main scanning direction with a plurality of light beams based on image data, the optical scanning method comprising:
    preprocessing the image data including
       dividing each pixel of the image data into a plurality of subpixels;
       deleting certain subpixels from the image data in accordance with predetermined correction data;
       shifting remaining subpixels in the sub-scanning direction in position of deleted subpixels thereby obtaining reduced image data; and
    controlling a plurality of light sources that is arranged at different positions in a sub-scanning direction based on the reduced image data in such a manner that one line of the subpixels is formed with a light beam emitted from a corresponding one of the light sources.

* * * * *